United States Patent [19]

Rhodes et al.

[11] 3,994,844

[45] Nov. 30, 1976

[54] VINYL HALIDE RESIN COMPOSITIONS CONTAINING ZINC ORGANIC PHOSPHITES

[75] Inventors: Philip H. Rhodes; Robert L. Ahr, both of Cincinnati, Ohio

[73] Assignee: Emery Industries, Inc., Cincinnati, Ohio

[22] Filed: Nov. 28, 1975

[21] Appl. No.: 635,954

Related U.S. Application Data

[63] Continuation-in-part of Ser. No. 172,247, Aug. 16, 1971, abandoned.

[52] U.S. Cl. .................. 260/23 XA; 260/45.75 W
[51] Int. Cl.² ........................................... C08K 5/52
[58] Field of Search ............... 260/45.75 W, 429.9, 260/23 XA

[56] References Cited
UNITED STATES PATENTS

| | | | |
|---|---|---|---|
| 3,219,605 | 11/1965 | Klemchuk | 260/429.9 |
| 3,396,144 | 8/1968 | Harrington et al. | 260/45.75 W |
| 3,467,683 | 9/1969 | Harson et al. | 260/45.75 W |
| 3,481,719 | 12/1969 | Patinkin | 44/69 |
| 3,733,288 | 5/1973 | Minagawa et al. | 260/45.7 P |

Primary Examiner—V.P. Hoke
Attorney, Agent, or Firm—Wood, Herron & Evans

[57] ABSTRACT

Novel hindered zinc organic phosphites are produced by the reaction of zinc carboxylic acid salts and organic phosphites. The hindered zinc organic phosphites are excellent sources for zinc in vinyl halide resin stabilizers to prevent resin degradation by heat and light. Vinyl halide resin compositions containing the hindered zinc organic phosphites in relatively large amounts of divalent zinc can be processed under elevated temperatures over extended periods of time without undergoing catastrophic degradation.

The hindered zinc organic phosphites are characterized by the formulas:

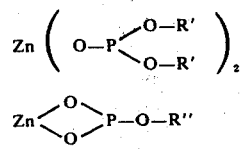

Where R' is either an alkyl, aryl, aralkyl, or alkaryl radical with the proviso that at least one R' radical is aryl or alkaryl; and R'' is aryl or alkaryl.

8 Claims, No Drawings

VINYL HALIDE RESIN COMPOSITIONS CONTAINING ZINC ORGANIC PHOSPHITES

RELATED APPLICATION

This application is a continuation-in-part of our application Ser. No. 172,247, filed Aug. 16, 1971, now abandoned.

BACKGROUND OF THE INVENTION

Vinyl halide resins are widely employed in the plastics industry as fabricating and packaging materials, coatings, and a variety of other applications. In these applications and in processing, vinyl halide resins must be stabilized aginst degradation by heat and light. Otherwise, when vinyl halide resins are processed or molded under elevated temperatures for extended periods, they tend to degradate. Degradation greatly reduces the mechanical properties of the resins and destroys their clarity and color. Many stabilizers have been proposed to reduce or largely prevent the degradation of vinyl halide resins under processing and service conditions. A somewhat distinct industry in commerce, most commonly called the "stabilizer" industry, has developed over the years whose principal purpose has been to provide better stabilizers for vinyl halide resin compositions. A very large amount of patent literature and other publications have been addressed to the development of vinyl resin heat and light stabilizers. Most commonly, these stabilizers have been based upon various metallic soaps, phenates, phosphites and other salts.

Early in the development of vinyl halide resin stabilizers, zinc salts or soaps were suggested. Since then, a significant amount of effort has gone into the development of stabilizers based upon zinc principally because of their cheapness, non-toxicity and prevention of atmospheric staining by sulfur compounds. It is well-known, however, that zinc soaps alone are not good primary stabilizers because zinc causes a phenomenon referred to in the art as "catastrophic degradation" of the vinyl halide resin. This phenomenon occurs when vinyl halide resins are processed at elevated temperatures. Initially, the resin has excellent color and clarity for a period of processing time, but then suddenly turns black wtihin a few seconds. More recent patents which refer to this phenomenon of catastrophic degradation include U.S. Pat. Nos. 3,262,896 and 3,575,905. More detailed theoretical discussion can be found in the book "The Stabilization of Polyvinyl Chloride" by F. Chevassus et al. (St. Martin's Press, Inc., New York, 1963).

Principally because zinc salts are cheap and non-toxic among other advantages, the stabilizer industry has actively pursued ways to solve the catastrophic degradation phenomenon. Among the various approaches proposed to overcome the deficiency of zinc include the addition of alkaline earth or alkali metal salts to the zinc stabilizer. A number of years ago, for example, it was reported that the sudden blackening of resins stabilized with zinc stearate could be delayed by employment of alkali metals or alkaline earth metals such as barium. However, in commercial operation, it was soon found that the zinc-barium combination was, in most cases, not a satisfactory solution to the problem because the barium component had to be used in relatively large amounts. Also, such large amounts of barium imparted to the resin what chemists have called "early color" which is to be avoided in clear resin stock applications. More recently, for example, in U.S. Pat. No. 3,262,896, potassium soaps were proposed for usage with zinc soaps with better results reported than previous combinations of barium or sodium soaps with zinc soaps. In addition, many other compounds have been proposed for use in combination with zinc with reportedly desirable results such as those mentioned in U.S. Pat. No. 3,067,166 where zinc compounds in combination with mercapto acid/primary alcohol esters were employed. In substance, the use of either alkali metal salts, alkaline earth metal salts, organic phosphites, hindered phenols, epoxidized oils and the like, will delay somewhat the phenomenon of sudden degradation, but such use has not been completely satisfactory. The divalent zinc component of these stabilizer systems can still only be used in minor amounts to avoid catastrophic degradation and, therefore, cost and performance advantages associated with using larger amounts of zinc have simply not been achieved.

In addition to the attempts which have been made to extend the heat stability of zinc stabilizers by the employment of other stabilizer ingredients, efforts have been made to define preferred ranges of zinc in the presence of other stabilizers so as to achieve the optimum concentration of zinc and still avoid sudden degradation. As previously reported in U.S. Pat. No. 3,575,905, it was found that small amounts of zinc, when combined with an aryl alkyl phosphite, are effective in deterring thermal degradation of vinyl halide resins. As disclosed in this patent, however, when zinc is present in concentrations higher than about 0.005 part of divalent zinc per 100 parts of resin, rapid degradation will result and this degradation is not prevented by any known auxiliary additives.

Metal organophosphorus compounds have been suggested in U.S. Pat. Nos. 3,467,683 and 3,284,386 where a divalent metal is linked through an oxygen to a phosphorus atom of an aryl phosphite and a carboxylic acid radical is attached to the other valence of the divalent metal. These compounds may be termed "half-soap" reaction products.

SUMMARY OF THE INVENTION

This invention is directed to hindered zinc organic phosphites characterized by the formulas:

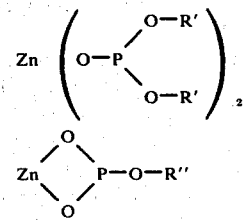

where R' is either an alkyl, aryl, aralkyl, or alkaryl radical with the proviso that at least one R' radical is aryl or alkaryl; and R" is aryl or alkaryl. The hindered zinc aryl phosphites are very effective heat stabilizers for vinyl halide resins.

The novel hindered zinc organic phosphites are prepared by the reaction of zinc carboxylic acid salts and organic phosphites. Where the molar ratio of the salt to the phosphite is 1:2; this reaction may be characterized by the following equation:

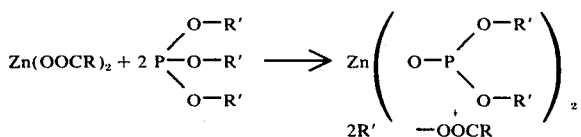

wherein the group RCOO is the carboxylate group of an aliphatic or aromatic mono or polyfunctional acid containing, for example, about $C_2$–$C_{54}$ carbon atoms, thus R is a hydrocarbon radical; R' of the organic phosphite reactant is either an alkyl, aryl, aralkyl or alkaryl radical with the proviso that at least one R' radical is aryl or alkaryl. For purposes of this description, the organic phosphite reactant is generally termed an aryl phosphite or an alkyl aryl phosphite, but it will be understood that the alkyl or aryl radicals may be arylalkyl or alkylaryl, respectively.

Where the molar ratio of the salt to the phosphite is 1:1, the hindered zinc aryl phosphite reaction product is

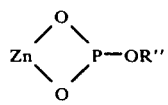

as above defined with co-produced carboxylic acid ester.

In either molar ratio, the ester interchange reaction produces hindered zinc organic phosphite reaction products having advantageous stabilizing properties. Analyses of reaction products support the hypothesized ester interchange reaction to produce a zinc bis- (diorgano phosphite) or zinc mono-(organo phosphite) and a co-produced carboxylic acid ester. Empirically it has been found that the zinc carboxylate-organic phosphite reaction products provide what is termed herein a "hindered" divalent zinc which can be incorporated into vinyl halide resins in significantly large amounts per 100 parts of resin for processing the resin under elevated temperatures over extended periods of time without causing catastrophic degradation. The term hindered is applied herein to the divalent zinc contained in the zinc carboxylate-organic phosphite reaction products because the catastrophic degradating activity of the divalent zinc is prevented or largely delayed for practical purposes.

This invention is predicated, therefore, in part upon the discovery that zinc carboxylates and aryl or alkyl/aryl phosphites can be reacted in what is an ester interchange reaction at elevated temperatures to produce hindered zinc organic phosphite reaction products and these reaction products have been found to be an extremely advantageous source of zinc for use in vinyl halide resin stabilization. Quite unexpectedly, in comparison to prior art stabilizer compositions containing zinc carboxylates and aryl or aryl/alkyl phosphites which have not been pre-reacted as in this invention, the hindered zinc organo phosphites of this invention permit larger amounts of divalent zinc to be used in vinyl halide resin formulations without catastrophic degradation of the resin. Empirically, it has been demonstrated that the amount of divalent zinc capable of introduction into vinyl halide resins via the hindered zinc organic phosphite reaction products of this invention is on the order of at least about 20 times or more of the amount which can usually be tolerated in such resins using the prior art nonhindered zinc systems without catastrophic degradation. This is, indeed, one of the remarkable results of this invention. Also, the zinc aryl phosphites of this invention far out perform a zinc half-soap reaction product which may be prepared according to the technique suggested in the mentioned U.S. Pat. No. 3,467,683, for example.

Furthermore, this invention provides cost advantages associated with the permissible use of larger amounts of zinc which, as mentioned, is a much cheaper source of stabilizer than cadmium, for example. As an additional advantage, the hindered zinc organic phosphites are non-toxic in comparison to cadmium, for example. Further, this discovery of hindered zinc phosphite compounds eliminates the need for other secondary or primary stabilizers in vinyl halide resin formulations. Among other advantages which will become more apparent in the detailed description hereinafter, improved color and clarity are achieved when the hindered zinc phosphites of this invention are employed in vinyl halide resin formulations.

The general method of preparing the hindered zinc phosphites of this invention involves reacting (a) a zinc carboxylic acid salt with (b) an organic phosphite selected from the group consisting of an alkyl aryl phosphite or an aryl phosphite under the influence of heat. The zinc carboxylic acid salts, commonly called "zinc carboxylates", may be characterized by the formula:

wherein the group RCOO is the carboxylate group of an aliphatic or aromatic mono or polyfunctional acid containing for example, about $C_2$–$C_{54}$ carbon atoms, thus R is a hydrocarbon or substituted hydrocarbon radical; and O is oxygen. These zinc salts have been widely developed in the art and are usually prepared by either a fusion or a double decomposition type reaction. In the direct fusion reaction, for example, two moles of a monocarboxylic acid are reacted with one mole of zinc oxide at elevated temperatures. In the double decomposition reaction or precipitation reaction, an alkali salt, e.g., sodium salt of a carboxylic acid is reacted with an equivalent amount of zinc chloride or sulfate in aqueous media. Reference may be had to literature for these methods of preparation of the zinc carboxylates as they are well understood in the art and per se form no part of this invention. Certain advantages have been found in using the fusion reaction, above mentioned, because such a reaction avoids water in the zinc carboxylate which would otherwise tend to hydrolyze the organo phosphite during the subsequent interchange reaction to produce some free phenol which is undesirable in the reaction products for the reasons detailed later.

The types of zinc carboxylates for reaction with the organic phosphites in accordance with the principles of this invention will vary depending upon economy, availability and convenience. The organo portion of the zinc carboxylate has not been found to appreciably affect the advantageous results of this invention. Because of their ready availability, zinc salts of fatty acids are preferred, more particularly, about $C_8$–$C_{24}$ monocarboxylic acids such as pelargonic, linoleic, 2-ethyl hexoic, lauric, myristic, palmitic, oleic, stearic acid and the like. This group includes saturated or unsaturated monocarboxylic acids. Further, polyfunctional carboxylic acids may be employed to form the zinc salts including azelaic, succinnic, $C_{36}$ dimer acid and $C_{54}$ trimer acid and the like. Dimer acid is a commercial mixture containing mostly $C_{36}$ saturated dicarboxylic acid whereas trimer acid is a commercial mixture of $C_{54}$ tricarboxylic acid; and their methods of preparation are referred to in U.S. Pat. No. 3,280,140. However, lower carbon atom-containing salts may be employed as the zinc carboxylate, such as zinc acetate. Therefore, in general, about $C_2$–$C_{54}$ carboxylic acid including the aliphatic or aromatic mono or polyfunctional acids may be used to form the zinc carboxylates. Specific examples of these zinc carboxylates include zinc stearate, zinc 2-ethyl hexoate, zinc octoate, zinc myristate, zinc palmitate, zinc laurate, zinc pelargonate, zinc acetate, etc. Similarly, aromatic carboxylates of the phthalic, benzoic, naphthoic type where R, in the above formula is aryl, diaryl, or substituted aryl may be employed such as zinc benzoate. In preparing hindered zinc phosphites from aromatic acids such as benzoic, phthalic, etc., the dry salts produced from double decomposition reactions have been used successfully, whereas the high melting points of most zinc salts of aromatic acids precludes their synthesis by fusion. The main criteria for the zinc carboxylate for use in this invention is its ability to react with the organo phosphite to form the hindered zinc organo phosphite reaction product.

Organo phosphites for use in the practice of the present invention have the following general formula:

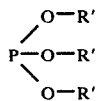

In the formula R' is selected from the group consisting of alkyl, aryl, aralkyl and alkaryl radicals having from about 6 to 25 carbon atoms with the proviso that at least one R' radical is aryl such that the organic phosphite may be generally termed herein as an alkyl aryl phosphite or an aryl phosphite. Mixtures of these phosphites can be used. Examples of phosphites falling within this formula are dibutyl phenyl phosphite, diheptyl phenyl phosphite, butyl diphenyl phosphite, isobutyl diphenyl phosphite, hexyl diphenyl phosphite, amyl ditolyl phosphite, triphenyl phosphite, octyl diphenyl phosphite, tris (nonyl phenyl) phosphite, trixylyl phosphite, dibenzyl phenyl phosphite, dodecyl diphenyl phosphite, nonyl diphenyl phosphite, and so forth. The organic phosphites are well known to the art. They can readily be derived from mixtures of alcohols and phenols, substituted phenols and so forth by reaction with phosphorus trichloride and separating the resulting organic chloride from the organic phosphite.

More particularly, in the method of this invention for producing the hindered zinc organo phosphites, the zinc carboxylate is reacted with the organic phosphite in a molar ratio of 1:2 or 1:1, respectively, according to the mechanisms described above. The reaction is promoted under the influence of heat. The temperatures of the reaction will vary but, generally, they are in the range of approximately 100°–250° C depending upon the zinc carboxylate or organic phosphite employed and the reaction time employed. For example, with zinc fatty acid salts and triphenyl phosphite, the reaction is usually conducted over a temperature range of approximately 175°–210° C for about 1 to 1½ hours.

Zinc carboxylates are readily available in commerce and can be utilized according to the principles of this invention. However, as mentioned above, it is preferred that the zinc carboxylate reactant be prepared by the direct fusion of the carboxylic acid and zinc oxide, followed by dehydration to remove by-product water. Dehydration of the zinc carboxylic acid salt prior to reaction with the organic phosphite is preferred to reduce the tendency of hydrolysis of some of the organic phosphite reactant to phenol. The presence of phenol is preferably avoided in the reaction product because of its intolerable odor and because of the susceptibility of personnel to phenol in handling and compounding the products in vinyl halide resin formulations. Further, to promote the ester interchange reaction, hydrolysis of the phosphite to phenol is preferably avoided.

Another preferred, but not essential, condition of the zinc carboxylate-organic phosphite reaction is conducting the reaction in the presence of a carboxylic acid. This is usually accomplished by adding about 10–20% molar excess of acid in the preparation of the zinc carboxylate or adding a similar amount to a previously prepared zinc carboxylate usually before reaction with the organic phosphite. This excess of a carboxylic acid tends to reduce viscosity during the reaction of the zinc carboxylate and organic phosphite and promotes homogeneous, stable products. It has been found that an excess of carboxylic acid will cause the reaction mixture to remain very fluid thereby facilitating mixing during the reaction. Furthermore, an excess of carboxylic acid during the reaction of the zinc salts and organic phosphite promotes the production of the desired co-produced ester and is also available for reaction with phenol to produce a phenyl ester co-product. Usually, a 10–20% excess of acid over the stoichiometric amount in making the zinc carboxylic acid salt produces clear and much more stable, hindered zinc phosphite reaction products contained in the co-produced esters. This clarity and stability of the hindered zinc organo phosphite so produced is usually reflected in the vinyl resins stabilized with the whole reaction products. Homogeniety in the reaction products also promotes ease of blending and handling when the products are mixed with solvents or diluents commonly used in vinyl halide resin formulations.

It is not necessary to remove the zinc bis- or mono-(organo phosphite) from the co-produced esters according to the ester interchange of this invention before the hindered zinc reaction product can be employed as a stabilizer. The whole reaction product of the zinc carboxylate-organic phosphite reaction can be employed as such in vinyl halide resin stabilization. Distillation of the whole reaction products has been accomplished to separate the co-produced esters from the zinc bis-(organo phosphite), for example, and the yields of recovered esters (about 75–85%) point out a further advantage of employing the practice of this invention to produce phenyl and alkyl esters of the carboxylic acid portion of the Zinc carboxylate reactant. Distillation of the zinc carboxylate-organo phosphite reaction product can be avoided, however, as an extra processing step and the hindered zinc reaction products still perform their advantageous stabilizing activity.

An additional advantage of the hindered zinc organic phosphite reaction products is their compatability with commercial systems of vinyl halide resin stabilizers such as the alkaline earth metal stabilizers including barium, etc. The advantageous activity of the hindered zinc compounds of this invention is pronounced in the presence of such standard alkaline earth metal stabilizers as well as the usual phosphites, epoxy compounds, lubricants, antioxidants and the like. When the hindered zinc phosphites of this invention are substituted for known zinc stabilizers in conventional commercial stabilizer systems, data demonstrates that the amount of divalent zinc capable of being introduced is well above (20 times or more) the level heretofore considered to be maximum without experiencing catastrophic vinyl halide resin degradation. Furthermore, early color is avoided and remarkable clarity in the vinyl halide resin is achieved. The amount of the hindered zinc organic phosphite suitable for use in the stabilization of vinyl halide resin formulations varies over a wide range and depends primarily upon the particular stabilizing needs of the vinyl halide resin formulator for a particular application. Usually this amount will vary over a range of 0.0001 to approximately 0.5 parts of divalent zinc per 100 parts of vinyl halide resin (phr). The designation phr as used herein means parts per hundred of the vinyl halide resin as well understood in the industry. The lower end of this range represents an approximate of a minimum effective amount of divalent zinc to achieve stabilization. The upper end of the range is not intended to be critically limiting. Rather, the recited range provides a workable range of effective amounts of divalent zinc in many different vinyl halide resin systems in a general sense and it will be obvious to those of ordinary skill in this art that the amounts of divalent zinc can vary within and without this range to achieve the stated advantages of this invention.

These and other advantages exhibited by the hindered zinc organic phosphites of this invention will be further understood with reference to the following examples which illustrate various methods for their production and their advantageous use as stabilizers in vinyl halide resin compositions.

The hindered zinc organo phosphites produced in the following examples were evaluated by a standard compounding technique and oven heat stability tests. The standard compounding technique was performed in both clear and filled stocks using as standard recipes in parts by weight:

| | | |
|---|---|---|
| (a) | Clear stock | |
| | vinyl halide resin (polyvinyl chloride) | 100 |
| | plasticizer (dioctyl phthalate) | 45 |
| | lubricant (stearic acid) | 0.5 |
| | epoxidized soya bean oil | 5 |
| | stabilizer composition | (as desired) |
| (b) | Filled stock | |
| | vinyl halide resin (polyvinyl chloride) | 100 |
| | plasticizer (dioctyl phthalate) | 45 |
| | lubricant (stearic acid) | 0.5 |
| | epoxidized soya bean oil | 5 |
| | filler (calcium carbonate) | 25 |
| | stabilizer composition | (as desired) |

The stabilizer composition noted in the above recipes is employed usually either on a 15 or 2 total parts by weight basis in the following examples for evaluation of the hindered zinc phosphites of this invention. In certain instances, the stabilizer composition is prepared in liquid form by blending the hindered zinc aryl phosphite reaction product with 12.0% by weight of Lubrizol LD 2101 (by Lubrizol Corp. which is an overbased barium complex containing about 20.5% barium; specified gravity of 1.16, approximately; flash point °F C.O.C. of 380; viscosity at 100 SSU of 200 and 200 SSU of 50; pour point, °F of +10; color, ASTM dilute of 3½; and sulfated ash of 34.5 min, 35.5 max.); 40.0% by weight of diphenyldecyl phosphite; with or without 2.0% of typical antioxidant and the balance of mineral spirits solvent to provide a stabilizer composition contributing either about 0.03 or 0.04 parts of Zn + +, as hereafter noted, per 100 parts of polyvinyl chloride (phr). However, as is to be understood, the total stabilizer composition typified by these mentioned ingredients is merely for evaluation purposes. Total parts by weight of stabilizer composition (phr) can vary over a broad range of about 0.5 to about 10 parts by weight, for example. Furthermore, as mentioned above, the amount of divalent zinc in the stabilizer composition can vary over a broad range. The barium complex, diphenyldecyl phosphite, antioxidant and solvent components used in the following stabilizer composition examples are not claimed to be important to this invention and merely represent an exemplary commercial stabilizer composition which illustrates the practice of this invention.

These clear and filled stock compositions have been employed as a common reference formulation in the commercial testing of polyvinyl chloride, but the concept and examples of this invention are equally applicable to familiar industrial variations. The stabilizer composition and stearic acid are weighed into a small aluminum cup. A premixed blend of 90% dioctyl phthalate and 10% epoxidized soya bean oil is weighed into the bowl of a mixer after which the stabilizer composition and lubricant are transferred from the cup to the bowl using a small rubber spatula. The cup is rinsed with the plasticizer blend from the bowl before discarding. The bowl, containing plasticizers, lubricant and stabilizer composition is placed on the mixer and mixing is started. The resin and filler (if used) are weighed into a beaker and added to the bowl while mixing. After several minutes of mixing, the mixer is stopped and the contents of the bowl transferred to a polyethylene bag for storage prior to milling. The so-prepared blends are compounded on a two roll mill at a roll temperature of about 340°– 350° F for about 5 minutes with continuous working. A sheet 30–40 mils thick is removed and cooled. From this are cut an 8½ by 11 inch sheet for aging storage and a strip 1 by 11 inches cut into 1 by 1 inch squares for oven heat stability testing.

Oven heat stability tests are conducted using the 1 by 1 inch squares of milled material in the thickness prepared. The test specimens are arranged on a series of eight 1½ by 10 inches glass slides. Each slide accommodates different samples and the slide is used as a shelf in a specifically built, electric rotary (Ferris wheel) oven. After starting the test, one slide is removed at an appropriate interval and the other slides are removed at succeeding equal intervals. In operating with the above clear and filled recipes, the oven is heated to about 380°–385° F, as indicated hereafter and one test specimen (one slide) is removed every 10 minutes providing a test period of 80 minutes exposure in 10 minute increments. The slides are cooled following removal from the oven and the test specimens are removed for observation and comparison.

EXAMPLE I

Preparation of Hindered Zinc Organic Phosphites

A. From Zinc Pelargonate and Triphenyl Phosphite in Presence of Excess Acid 534 grams of pelargonic acid (3.3 moles) were charged into a 2 liter reaction flask equipped with a cover having 4 inlets using a variable speed stirrer, a Dean-Stark moisture trap with reflux condenser, a thermometer in the reaction mixture and one opening for addition. An electric heating mantle was used as a jacket on the flask.

The charged acid was heated over a period of about 1 hour to a temperature of about 155° C at which point 122.1 grams of ZnO (1.5 moles) was incrementally added. Reaction was rapid and liberated $H_2O$ was observed in the Dean-Stark trap. Approximately 8–10 minutes was required to add all the ZnO. After about 30' the temperature had been raised to about 200°.C and about 20 ml. $H_2O$ had been liberated and recovered. At this point 930 grams triphenyl phosphite (3.0 moles) were added causing the temperature to fall to about 140° C. Heating and stirring continued and in about 30' the temperature was at 200° C where it was maintained for 1 hour after which the product was allowed to cool to room temperature. Yield was as calculated and the resulting product was a clear yellow-orange solution containing approximately 6.27% Zn.

A typical analysis of a clear yellow-orange liquid reaction product obtained by a reaction procedure similar to the above showed the following. About 350 grams of reaction product were charged to a vacuum distillation apparatus for distillation of the reaction product into main fractions. The vacuum distillation column was operated under vacuum approximately at 3 mm/Hg. Three main fractions were obtained. The first fraction in an amount of 9 grams was obtained over a period of 35 minutes at a distillation pot temperature of 138° C and a vapor temperature of approximately 121° C. The second fraction in an amount of about 69 grams was obtained over a period of approximately 50 minutes at a distillation pot temperature of 150° C and a vapor temperature of approximately 135° C. The third fraction was obtained over a period of 65 minutes at a pot temperature of approximately 200° C and a vapor temperature of approximately 173° C. The residue remaining in the distillation pot amounted to approximately 175 grams. Accordingly, 349 grams of the 350 grams charged to the distillation apparatus were accounted for. Infrared spectral analyses for each of the above fractions characterized the first fraction as containing approximately 53.4% phenol and 46% phenyl perlargonate. The second fraction was characterized as containing approximately 97% of phenyl perlargonate. The third fraction was characterized as containing approximately 56.4% of phenyl perlargonate and approximately 40% of unreacted triphenyl phosphite. The pot residue contained 13.2% zinc by atomic absorption. The hindered zinc bis (diphenyl phosphite) reaction product is thus formed according to the following chemical equation:

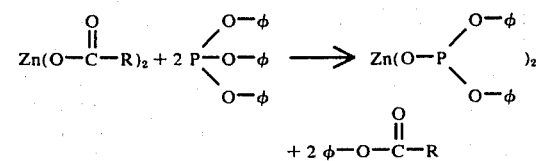

The yield of the zinc bis(diphenyl phosphite) based upon the 175 gram residue was approximately 100% theoretical. The yield of the phenyl pelargonate by-product was approximately 83% of theoretical based upon the percent analyzed for this derivative. The remaining amounts of materials in the reaction product mixture were characterized as phenol and unreacted triphenyl phosphite. To further substantiate the presence of phenyl pelargonate in the above mentioned second fraction, that fraction was transesterified with $LiOCH_3$ to give the methyl esters of the acid function; and GLC studies showed methyl pelargonate and free phenol thus identifying the ester.

B. From Zinc Pelargonate and Triphenyl Phosphite Without Excess Acid

The procedure of Example A was repeated except that 486 grams of pelargonic acid (3.0 moles) was employed in a stoichiometric amount according to the postulated reaction equation. Again, 20 ml of water was recovered. The resulting product was slightly lighter in color and substantially more viscous than the product of Example A. It contained 6.56% Zn as Zn++ calculated on the basis of the whole product of the reaction.

C. From Zinc Pelargonate and Triphenyl Phosphite In Presence of $H_2O$

The procedure of Example A was repeated except that triphenyl phosphite was added after the completion of ZnO addition when only 15 ml. of water has been liberated. The reaction mixture never became clear and the reaction product was recovered as a white, opaque gel-like viscous liquid containing 6.2% Zn on a calculated basis for the whole reaction product.

D. From ZnO, Pelargonic Acid and Triphenyl Phosphite

ZnO, pelargonic acid and triphenyl phosphite in amounts identical to those used in Example A were employed in this example.

The triphenyl phosphite and pelargonic acid were charged to the same quipment as in the preceding examples. The temperature of the mix was raised to 156° C and the addition of ZnO was started. Some reaction appeared to occur but no $H_2O$ was liberated or recovered in the Dean-Stark trap. ZnO addition was completed after about 5 minutes during which time the temperature rose to about 200° C without any liberation of $H_2O$. Temperature was maintained for 1 hour at 200°–210° C and product removed to cool. The resulting whole reaction product was an opaque white gel calculated to contain 6.2% Zn.

E. From Zinc Stearate and Triphenyl Phosphite in Presence of Excess Acid

The following amounts of materials were employed in this example: 616 grams stearic acid (2.2 moles), 81.4 grams of ZnO (1.0 mole) and 620 grams triphenyl phosphite (2.0 moles).

The reaction was run as in Example A. The stearic acid was charged to the reaction flask and melted after which it was heated to about 155° C with stirring. ZnO addition was made and water was slowly liberated. At 204° C about 40' after starting ZnO addition, there had been 11 ml H₂O collected. Triphenyl phosphite addition was made and about 40' later temperature was back up to 196° C. Temperature was raised to about 200° C and maintained for 1 hour after which the product was allowed to cool to room temperature producing a light tan waxy solid having a calculated Zn content of 5.07%.

F. From Zinc Stearate and Triphenyl Phosphite Without Excess Acid

The procedure of Example E was repeated except that a stoichiometric amount of stearic acid, i.e., 560 grams (2.0 moles), was employed. The resulting product was similar to that produced in Example E, i.e., a light tan waxy solid. The calculated Zn content of the whole reaction product was 5.25%.

G. From Zinc Neodecanoate and Triphenyl Phosphite in Presence of Excess Acid

The procedure of Example A was repeated except that 568 grams of neodecanoic acid (3.3 moles) were employed instead of pelargonic acid. The amount of neo-acid was thus employed in 10% excess. The resulting product was a clear, brown viscous liquid calculated to contain 6.13% Zn.

H. From Zinc 2-Ethylhexoate and Triphenyl Phosphite in Presence of Excess Acid

The procedure of Example A was repeated except that 475 grams of 2-ethylhexoic acid (3.3 moles) were employed instead of pelargonic acid. The resulting product was a light yellow-orange, hazy almost gel-like solution calculated to contain 6.46% Zn.

The whole reaction product comprising the hindered zinc organic phosphites of Examples A through H were used to prepare test stabilizer compositions by formulating 100 gram samples of ingredients as shown in Table I in a manner generally generally described above. Each sample contained:
- 2.0 grams of Zn metal equivalent
- 2.4 grams of Ba metal (as Lubrizol 2101, identified above) where indicated
- 40 grams of diphenyl decyl phosphite
- Balance of mix, mineral spirits solvent pounded according to the general compounding procedure discussed above in clear stock at a level of 1.5 parts by weight stabilizer composition contributing 0.02 parts Zn per 100 parts polyvinyl chloride (PVC), heat stability tests were performed as described above and the following results were observed in Table II. The approximate time lapse for first noticeable yellow color and for complete blackening were noted in each sample. If no first color change was really noticeable or if no complete blackening was observed over the 80 minute test period, the designation "none" is recorded in Table II.

TABLE II

| PVC Stabilized Stock | OVEN TIME | |
|---|---|---|
|  | First Color | Complete Blackening |
| A' | 50' | 60' |
| A'' | 70' | None |
| B' | 60–70' | None |
| C' | 60–70' | None |
| D' | 20' | None |
| E' | 70' | None |
| F' | 70' | None |
| G' | 70' | None |
| H' | 60' | 80' |

A detailed comparison of Tables I and II demonstrates generally that, in accord with the principles of this invention, a hindered zinc organic phosphite which is the reaction product of a zinc carboxylic acid salt and an aryl phosphite is an effective heat stabilizer for vinyl halide resins. In the case of the reaction products of Examples A–C and E–H, and PVC stabilizer compositions A'–C' and E'–H' (Tables I and II), the early color change only takes place after about 50 minutes or even 60–70 minutes and catastrophic degradation of the PVC is largely delayed to 60–80 minutes (Examples A' and H' of Table II) or even prevented entirely (Examples A'', B'–C', E'–G' of Table II) over the test period. In contrast, where an attempt was made to react ZnO, carboxylic acid and aryl phosphite (Example C) together, instead of a zinc carboxylate and an aryl phosphite as in this invention, oven heat stability tests showed a pronounced yellow color in the stabilized PVC (Example D' of Table II) at only 20 minutes. Such

TABLE I

| Ingredients | | | | Test Stabilizer Compositions | | | | | | | |
|---|---|---|---|---|---|---|---|---|---|---|---|
|  |  |  |  | A' | A'' | B' | C' | D' | E' | F' | G' | H' |
| Product | of | Example | A-6.27% Zn | 32.5 | 32.5 | | | | | | | |
| Product | of | Example | B-6.56% Zn | | | 30.5 | | | | | | |
| Product | of | Example | C-6.2% Zn | | | | 32.2 | | | | | |
| Product | of | Example | D-6.2% Zn | | | | | 32.2 | | | | |
| Product | of | Example | E-5.07% Zn | | | | | | 39.5 | | | |
| Product | of | Example | F-5.25% Zn | | | | | | | 38.1 | | |
| Product | of | Example | G-6.13% Zn | | | | | | | | 32.6 | |
| Product | of | Example | H-6.46% Zn | | | | | | | | | 31 |
| Lubrizol No. 2101 (20.5% Ba) | | | | | 12 | 12 | 12 | 12 | 12 | 12 | 12 | 12 |
| Diphenyl decyl phosphite | | | | 40 | 40 | 40 | 40 | 40 | 40 | 40 | 40 | 40 |
| Mineral Spirits | | | | 27.5 | 15.5 | 17.5 | 15.8 | 15.8 | 8.5 | 9.9 | 15.4 | 17 |

The test stabilizer compositions have been designated A' through H' in Table I to correspond with reaction products of Examples A through H as contained therein.

Test stabilizer compositions A', A'', B', E', G' and H' were characterized as homogeneous, clear liquid compositions. In comparison, compositions C', D' and F' contained some incompatible solids and were not completely homogeneous liquids. After each of the test stabilizer compositions A' through H' were coman early yellow color in Example D' of Table II is unsatisfactory. Example D' therefore illustrates the importance of reacting a zinc carboxylate with an aryl phosphite to obtain the desired ester interchange and form the desired hindered zinc organic phosphite in this invention. It is hypothesized that the reaction of Example D proceeds with neutralization of the carboxylic acid by ZnO which liberates water. The liberated water reacts with the triphenyl phosphite to produce free phenol and hydrolyzed phenyl phosphite. Reaction of the water is evidenced by the fact that in Example D above no water is driven off during the course of the reaction even at the high temperatures. Accordingly, in order to obtain both a delayed early color degradation and prevention of catastrophic degradation for practical purposes, the zinc carboxylate is reacted with the aryl phosphite to produce a hindered zinc organic phosphite of this invention.

Upon comparison of Example A with Example B above, it is preferred in accordance with the principles of this invention to conduct the reaction with a slight excess of the pelargonic acid ingredient to lower the viscosity of the reaction mass thereby affording ease of mixing during the reaction. Further, the excess acid promotes the production of a hindered zinc organic phosphite which yields a clear homogeneous liquid reaction product devoid of phenolic odor upon blending with diluent. Clarity and homogeniety of stabilizer compositions are important considerations to a resin formulator because homogeniety affords ease in handling and addition of the stabilizer to the resin. Furthermore, clarity of the stabilizer usually promotes clarity in the stabilized plastic. Also, phenol in the reaction product presents health hazards to the vinyl resin formulator because it will attack human tissue with probable serious side affects and phenolic odors present somewhat intolerable working atmospheres for personnel. It is hypothesized that other advantages of conducting the reaction in the presence of excess pelargonic acid include (1) a complete reaction of the zinc oxide with the pelargonic acid to form the fatty acid salt for ester interchange and (2) providing extra pelargonic acid to promote the formation of phenyl pelargonate as a main byproduct of the ester interchange reaction thereby also preventing the escape of phenol during the ester interchange.

The heat stability data for A'' and B' of Table II do illustrate that even though an excess of acid was not employed in the reaction according to Example B, the stabilizer performance of the resulting hindered zinc reaction product was not adversely affected under the conditions tested. There was, however, a slight improvement in early color for A'' (70 minutes) versus B' (60-70 minutes). Further, by comparing A' (without Ba metal) and A'' (with Ba metal) of Table II, early color is improved and blackening is further delayed in the Zn and Ba system of A''.

For the purpose of demonstrating the effect of incomplete removal of water upon reaction conditions and product properties of Example A, Example C above was performed. The presence of water induces hydrolysis of triphenyl phosphite to free phenol and the presence of phenol has the disadvantages associated therewith as mentioned above. Furthermore, when compounded with the diluent, stabilizer composition C' was slightly inhomogeneous which detracts from the advantages of homogeneity mentioned above in connection with Compositions A' or A''. However, when the product of Example C was compounded in accordance with the general procedure mentioned above and heat stability tests were conducted for clear stock as in C' of Table II, C' behaved almost identically to A'' in that no catastrophic degradation was noted and first color appeared at about 60-70 minutes oven testing. Thus a very slight sacrifice in early color was noted for Example C' in comparison to Example A'' of Table II.

For the purpose of illustrating the preparation of the hindered zinc phosphites directly from a zinc fatty acid salt other than zinc pelargonate, Example E was performed above from zinc stearate with an excess of stearic acid. For comparative purposes, the reaction of Example F was performed without an excess of stearic acid. Example E and F reaction products, upon preparation of stabilizer compositions E' and F', E' was clear and homogeneous. In contrast F' was slightly inhomogeneous. Therefore, for the reasons mentioned in connection with Examples A-B above, it is preferred to conduct the preparation of hindered zinc phosphites in the presence of carboxylic acid. The reaction products of both Examples E and F were evaluated for heat stability performance in Table II and substantially identical behavior was noted. Early color was the same at about 70 minutes and no catastrophic degradation occurred over the oven testing period.

To further illustrate the practice of this invention, particularly the variety of the zinc carboxylates which can be employed, Examples G and H were conducted above employing neodecanoic acid and 2-ethylhexoic acid respectively, as the zinc salt forming acids. The heat stability data of Table II demonstrates good early color for both G' (70 minutes) and H' (60 minutes) with blackening occurring only in H' (zinc neodecanoate/phosphite reaction product) after about 80 minutes. It is believed that stearic hindrance in the reaction of zinc neodecanoate and triphenyl phosphite may contribute to the slight loss in early color and in time to blackening in H' of Table II.

EXAMPLE II

Preparation of Hindered Zinc Reaction Product of Zinc Acetate and Triphenyl Phosphite The preparation of hindered zinc phosphite stabilizer was conducted in a beaker equipped with thermometer employing zinc acetate as the reactant for the ester interchange reaction with triphenyl phosphite. Zinc acetate ($0.2H_2O$) in an amount of 219.5 grams (1.0 mole) was mixed with 32 grams (0.2 mole) of pelargonic acid in the beaker. The mixture was then heated to approximately 100° C whereupon it became fluid and had an acetic acid odor. As the temperature was raised to approximately 121° C, the mixture was dehydrated. At 136° C, 620 grams (2.0 moles) of triphenyl phosphite was added whereupon a white dispersion resulted under agitation as the temperature dropped to approximately 116° C with foaming. As the temperature was then increased from 116° to about 220° C over a period of approximately one hour, the reaction mass became more fluid and resulted in a clear but viscous yellow solution having a pleasant odor, characteristic of phenyl acetate. After cooling to room temperature, a clear yellow gel resulted which was characterized as containing 8.35% zinc on a calculated basis.

The reaction product of this example was then compounded and incorporated in 1.5 parts of standard stabilizer composition as discussed above with antioxidant. The stabilizer composition constituted 0.03 parts zinc (Zn++) phr. After 80 minutes of oven testing at 385° F, no degradation was noted and thus, the heat stability performance of the hindered zinc phosphite product of this example was comparable to the reaction products of the preceding examples.

EXAMPLE III

Preparation of Hindered Zinc Reaction Product of Zinc Azelate and Triphenyl Phosphite A hindered zinc phosphite reaction product was prepared by premixing 251.4 grams (1.0 mole) of zinc azelate with 19 grams (0.2 mole) of azelaic acid and 620 grams (2.0 moles) of triphenyl phosphite. After all ingredients were premixed, the reaction mixture was heated in a reaction flask to approximately 120° C, at which time a light yellow, pasty mix resulted. As the temperature was increased over a period of about 25 minutes to 196° C, the reaction mixture became more fluid and gave the appearance of a completely homogeneously dissolved mix. At approximately 15 minutes later, a clear yellow viscous material resulted and for approximately the next hour the temperature was reduced to about 170° C. Thereafter, the temperature was then increased over a period of about 1 hour 15 minutes to approximately 245° C and a clear, yellow watery solution resulted. As the reaction mixture was set aside to cool to room temperature, a clear, yellow gelled mass resulted. The product was characterized as containing 7.34% zinc on a calculated basis.

The product of this reaction was compounded and oven heat stability tests were performed in accordance with the above generally described procedure. 1.5 parts of the standard stabilizer formulation with antioxidant and contributing approximately 0.03 parts zinc (Zn++) phr behaved in accord with previous examples in that no degradation was noted after 80 minutes at 385° F oven testing. Therefore, this example further demonstrates, as discussed in the description above, that organic dicarboxylic acid salts of zinc are suitable for use in the preparation of the hindered zinc phosphites of this invention.

EXAMPLE IV

Preparation of Hindered Zinc Reaction Product of Zinc Linoleate and Triphenyl Phosphite A hindered zinc phosphite product of this invention was also prepared by introducing 315 grams (1.1 moles) of linoleic acid into a reaction flask followed by heating over a period of about one-half hour to 150° C. Then, zinc oxide was slowly added over a period of about 10 minutes in an amount of 40.7 grams (0.5 mole) under agitation. The reaction mixture foamed evidencing a reaction occurring with partial clearing while foaming. As the temperature was increased to approximately 196° C over a period of about one-half hour, a clear, watery, very dark liquid resulted. At this point 310 grams (1.0 mole) of triphenyl phosphite were added whereupon the temperature of the reaction mixture fell to approximately 123° C. The resulting reaction mixture was a hazy orange liquid. As the temperature was then increased to approximately 200° C, over a period of approximately 1 hour and a half, the reaction mixture became more fluid of almost a watery consistency with clearing. A cloudy orange, watery liquid resulted and further heating was conducted under reflux. After 30 minutes additional heating at approximately 202°–204° C, the reaction mixture was set aside to cool. Upon cooling to room temperature, a cloudy orange watery liquid resulted. The product was characterized as containing 5.0% zinc on a calculated basis.

The hindered zinc reaction product of this example was compounded and a heat stability evaluation was made as in Example III above wherein the stabilizer composition contributed 0.03 parts of zinc (Zn++) phr. The results of the oven heat stability testing at 385° F, after 80 minutes, showed no degradation and this behavior is similar to the behavior of the previous hindered zinc compounds prepared by the foregoing Examples II–III. This example also demonstrates applicability of unsaturated fatty acids in forming the organo portion of the zinc carboxylate for reaction with the aryl phosphite as developed above in the description.

EXAMPLE V

Preparation of Hindered Zinc Reaction Product of Zinc Pelargonate and Diphenyl Decyl Phosphite While the above examples illustrate the practice of this invention where a variety of zinc carboxylic acid salts are employed as reactants for ester interchange with the aryl phosphite, namely, triphenyl phosphite, the principles of this invention equally apply to other aryl or aryl-alkyl phosphites. In this example, diphenyl decyl phosphite was substituted for the triphenyl phosphite employed in the previous examples.

356 grams (2.2 moles) of pelargonic acid were weighed into a beaker and heated up to a temperature of approximately 138° C. The heated acid fumed while melting in the beaker. After approximately 30 minutes of heating and the temperature rising to approximately 155° C, 81.4 grams (1.0 mole) of zinc oxide were introduced into the beaker. A reaction occurred rapidly with a water being liberated. After foaming subsided, clear yellow viscous material resulted. As the temperature was increased to approximately 200° C, there was no noticeable change in the liquid nature of the reaction mixture, but a strong pelargonic acid odor was noted. At about 200° C, diphenyl decyl phosphite in an amount of 748 grams (2.0 moles) was added to the reaction mixture and the temperature fell to approximately 108° C. A tan yellow pasty solid resulted. The reaction mass was then placed under reflux as the temperature was elevated over a period of approximately 1 hour to 200° C. During this period of time the reaction mixture became a clear, orange liquid. As the temperature was increased, viscosity was reduced. At approximately 200° C, the reaction mixture was cooked for about 1 hour whereupon a clear orange watery solution resulted. At room temperature, the reaction product was characterized as a clear orange watery liquid having a calculated zinc content of 5.93%.

When the hindered zinc phosphite of this reaction was compounded and tested for oven heat stability according to the above procedure of Examples III–IV, no degradation of the vinyl halide resin formulation was observed over an 80 minute period at 385° F. The stabilizer composition was employed at a level of 1.5 parts by weight contributing 0.03 parts of zinc (Zn++) phr. Accordingly, other aryl phosphites may be employed as defined generally in the above description of this invention as a satisfactory substitute for the triphenyl phosphite in the previous examples to produce the hindered zinc phosphites of this invention.

EXAMPLE VI

The advantages of this invention become further apparent by comparison of the hindered zinc phosphite compounds of this invention as prepared and tested in Example I above and Tables I and II, with non-hindered mixtures of zinc fatty acid salts and phosphites known in the prior art. For this purpose the following test stabilizer compositions of Table III were prepared for direct comparison with Tables I and II above. Zinc octoate and zinc neodecanoate in 16% by weight solutions in mineral spirits were used as sources of non-hindered zinc and these solutions were used to prepare 100 gram samples in a manner identical to Table I, above where each sample in Table III contained:

- 2.0 grams of Zn metal equivalent
- 2.4 grams of Ba metal (as Lubrizol 2101, identified above) where indicated
- 40 grams of diphenyl decyl phosphite
- Balance of mix, mineral spirits solvent

TABLE III

| Ingredients | Test Stabilizer Composition Examples | | | |
|---|---|---|---|---|
| | 1 | 2 | 3 | 4 |
| Zinc octoate solution | 12.5 | | 12.5 | |
| Zinc neodecanoate solution | | 12.5 | | 12.5 |
| Lubrizol No. 2101 (20.5% Ba) | | | 12 | 12 |
| Diphenyl decyl phosphite | 40 | 40 | 40 | 40 |
| Mineral Spirits | 47.5 | 47.5 | 35.5 | 35.5 |

The heat stabilities of PVC stabilized stock on stabilizer composition Examples 1–4 of Table III were performed in a manner identical to that described for Examples A' through H' above and the results are reported in Table IV in approximate time lapse for complete blackening.

TABLE IV

| PVC Stabilized Stock | OVEN TIME Complete Blackening |
|---|---|
| 1 | 30' |
| 2 | 30' |
| 3 | 40' |
| 4 | 40' |

By comparison of Tables I–II with Tables III–IV, certain remarkable observations can be made. First, the hindered zinc organic phosphite reaction product of Example A' contributed the same amount of zinc as Examples 1 and 2, above, in the presence of diphenyl phosphite, but the heat stability in terms of time to blackening was extended an additional 30' as evidenced by comparing A' of Table II with 1 and 2 of Table IV. Therefore, under identical conditions, prior art mixtures of zinc carboxylates such as zinc octoate and zinc neodecanoate with organic phosphites contributing the same amount of zinc as the hindered zinc organic phosphites of this invention are about one-half as effective in delaying catastrophic degradation.

Furthermore, in the presence of the same amount of Ba, the hindered zinc organic phosphite reaction products of Examples A'–C' and E'–H' of Table II when compared to non-hindered zinc of Examples 3 and 4 of Table IV, performed in a far superior manner even though the amount of zinc contributed by all the test formulas of Tables II and IV was identical, i.e., 0.02 zinc phr. Specifically, prior art mixtures of zinc carboxylates, organic phosphites and Ba (Examples 3 and 4) blackened after 40'. In remarkable contrast, when hindered zinc phosphites of this invention are substituted in identical amounts of zinc metal equivalent, either no blackening occurred even after 80' in Examples A''–G' or only occurred at 80' in Example H'.

The above examples demonstrate that whole reaction products of this invention (i.e., containing mainly the hindered zinc organic phosphite and by-product ester) have remarkable utility in the stabilization of vinyl halide resins. It was pointed out in the description of this invention that it was not necessary to isolate the hindered zinc organic phosphite from the products of the reaction, for example, the by-product esters, in order to obtain their advantageous stabilizing properties. However, when a typical hindered zinc organic phosphite is isolated as described in Example I from the reaction product mixture and tested for heat stability as above described for PVC, no catastrophic degradation was noted over an 80' period at 385° F in amounts of zinc equivalent (about 0.02 zinc phr) comparable to the amounts of zinc contributed by the whole reaction products tested in the above Examples.

EXAMPLE VII

Comparison of Zinc Bis-(Organo Phosphite) With Zinc Mono-(Organo Phosphite)

For the purpose of comparing the stabilizing effectiveness of the mono- and bis-hindered zinc reaction products of this invention, the following test procedures 1 and 2 were performed. Test procedure 1 illustrates the preparation of a hindered zinc mono-(organo phosphite) by the reaction of zinc caprylate and triphenyl phosphite at a molar ratio of 1:1. Test procedure 2 demonstrates the preparation of the zinc bis-(organo phosphite) at a molar ratio of 1:2 of the zinc salt and the organic phosphite.

Test procedure 1 employs the following reactants:
- 454.2 grams caprylic acid
- 122.1 grams zinc oxide
- 465.0 grams triphenyl phosphite The caprylic acid was placed in a four-neck flask equipped with a stirrer, thermometer well and Dean-Stark trap, and heated to 153° C at which point addition of the zinc oxide was started. The addition of zinc oxide was over a 30 minute period at which time the temperature was 149° C and 25 ml of $H_2O$ had been removed in the trap. Heating was continued to about 200° C removing another 2ml. of $H_2O$. At this point the triphenyl phosphite was added and the temperature fell to about 150° C. The solution was reheated to about 200° C and held at that temperature for about 5 hours after which the Dean-Stark trap was removed and a downward condenser for distillation was substituted. The mixture was allowed to cool to room temperature by standing overnight. On the following day the viscous solution was reheated under vacuum (about 3mm) and several distilled fractions were removed until the viscosity of the contents of the flask was too high for operation of the agitator. This occurred at a flask temperature of 223° C with a vapor temperature of 174° C and at about 3mm pressure. About 543 grams of distillate were recovered and analysis of the distillate (by GLC) indicated recovery of about 75% of the starting caprylic acid in the form of phenyl caprylate. The flask residue contained about 22% zinc by atomic absorption analysis.

The test procedure 2 was followed for comparison with test procedure 1 where, as mentioned above, the molar ratio of the reactants was varied to provide 1 mol of the neutral zinc carpylate with 2 mols of the triphenyl phosphite. The amounts of materials were as follows:

302.8 grams carpylic acid
81.4 grams zinc oxide
620.0 grams triphenyl phosphite

The reaction was conducted in the same manner as the technique for test 1 above. About 50% of the reaction product was distilled over before the flash residue became too viscous to stir. The still residue contained about 12.5% zinc.

The hindered zinc mono- and bis- phosphites of test procedures 1 and 2 were tested for stabilizing activity in accordance with a procedure of standard compounding technique, similar to that described above except that the formula for testing included:

100 parts of vinyl halide resin
45 parts of dioctylphthalate
0.5 parts of stearic acid
5 parts of epoxy soya and 1.5 parts of an intended stabilizer composition In the stabilizer composition, each zinc-containing product was employed as the sole stabilizing additive and incorporated to provide 0.02 grams of zinc per 100 grams of resin. All ingredients were milled for about 5 minutes at 345° F, taken from the mil at 0.030 to 0.035 inch thickness and 1 × 1 inch specimens compared for heat stability using an oven at 375° F. The initial specimens were removed after 10 minutes of heating and subsequent specimens were removed at 5 minute intervals.

Upon heat stability testing of the zinc products of procedures 1 or 2, the polyvinyl halide resin composition discolored by darkening after about 45 and 50 minutes, respectively, at about 375° F. Accordingly, the above tests demonstrate that either the zinc mono- or bis- phosphite of this invention, resulting from either a 1:1 or 1:2 molar reactant ratio of a neutral zinc salt to organic tertiary aryl phosphite, provide a heat stabilizing effectiveness. Furthermore, such a stabilizing effectiveness can be achieved even in the absence of phosphite antioxidants or barium stabilizers.

EXAMPLE VIII

Comparison of Heat Stabilizing Effectiveness of Zinc Bis-(Diphenyl Phosphite) of Example I A With Half-Soap Product Via Example 15 Procedure of U.S. Pat. No. 3,467,683

A half-soap was produced according to the procedures of Example 15 of U.S. Pat. No. 3,467,683, but by reacting 2 moles of ZnO, 2 moles of pelargonic acid and acetic acid, followed by reaction with ⅔ mole of triphenyl phosphite. The half-soap and the zinc bis-(diphenyl phosphite) of this invention were each tested at a 2% level (0.02 parts zinc) in a resin formula of 100 parts polyvinyl chloride, 45 parts dioctylphthalate, 5 parts epoxidized soya bean oil, 0.5 part stearic acid, 40% by weight diphenyldecyl phosphite, and 2.85% barium, as in the above description. After oven heat stability testing at 375° F, the half-soap resin sample blackened at about 50 minutes, whereas the zinc bis-(diphenyl phosphite) resin sample did not blacken even after 80 minutes. This demonstrated the far superior effectiveness of the products of this invention in comparison to such half-soaps.

In each of the above examples the vinyl halide resin which was employed is a homopolymer of vinyl chloride, i.e., polyvinyl chloride. It is to be understood, however, that this invention is not limited to a particular vinyl halide resin such as polyvinyl chloride, of course. Other halogen-containing resins which are employed and illustrate the principles of this invention include chlorinated polethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C:CHCl$ to polyvinyl chloride $(CH_2—CHCl—)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers; and the like. Of course, the vinyl halide commonly used in the industry is the chloride, although others such as bromide and fluoride may be used. Furthermore, while dioctyl phthalate and stearic acid were employed as a plasticizer and a lubricant above, it is understood that these are typical examples and other components can be substituted therefor. The ingredients employed in the above examples are intended to illustrate the best present mode of practicing this invention, but this invention is not to be limited thereto as will be understood by one of ordinary skill in this art.

What is claimed is:

1. A heat stabilized vinyl halide resin composition comprising a vinyl halide resin and, as the heat stabilizer in an effective amount, a hindered zinc organic phosphite having the formula selected from the group consisting of

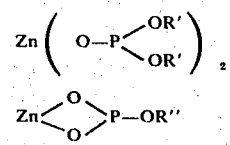

and where R' is alkyl, aryl, aralkyl, or alkaryl with the proviso that at least one R' is aryl or alkaryl and where R" is aryl or alkaryl.

2. The composition of claim 1 wherein R' or R" has from about $C_6$ to about $C_{25}$ atoms.

3. The composition of claim 1 wherein the aryl group of said aryl or alkaryl is phenyl.

4. The composition of claim 1 wherein said effective amount of phosphite provides from about 0.0001 to about 0.5 parts of divalent zinc per 100 parts of resin.

5. The composition of claim 1 which additionally contains a carboxylic acid ester.

6. The composition of claim 5 wherein said carboxylic acid contains about $C_2$–$C_{54}$ carbon atoms.

7. The composition of claim 6 wherein the carboxylic acid is a fatty acid.

8. The composition of claim 1 wherein said vinyl halide resin is polyvinyl chloride.

* * * * *